Feb. 28, 1956 A. F. PIERCE Re. 24,124

SHEET HANDLING MECHANISM

Original Filed June 6, 1949 6 Sheets-Sheet 1

INVENTOR.
ALFRED FRANK PIERCE
BY
Reynolds, Beach & Christensen
ATTORNEYS

SHEET HANDLING MECHANISM

Original Filed June 6, 1949 6 Sheets-Sheet 2

INVENTOR.
ALFRED FRANK PIERCE

BY
Reynolds, Beach & Christensen

ATTORNEYS

Feb. 28, 1956 A. F. PIERCE Re. 24,124

SHEET HANDLING MECHANISM

Original Filed June 6, 1949 6 Sheets-Sheet 3

INVENTOR.
ALFRED FRANK PIERCE

BY
Reynolds, Beach & Christensen
ATTORNEYS

Feb. 28, 1956 A. F. PIERCE Re. 24,124

SHEET HANDLING MECHANISM

Original Filed June 6, 1949 6 Sheets-Sheet 4

INVENTOR.
ALFRED FRANK PIERCE

BY
Reynolds, Beach & Christensen
ATTORNEYS

Feb. 28, 1956 A. F. PIERCE Re. 24,124
SHEET HANDLING MECHANISM
Original Filed June 6, 1949 6 Sheets-Sheet 5
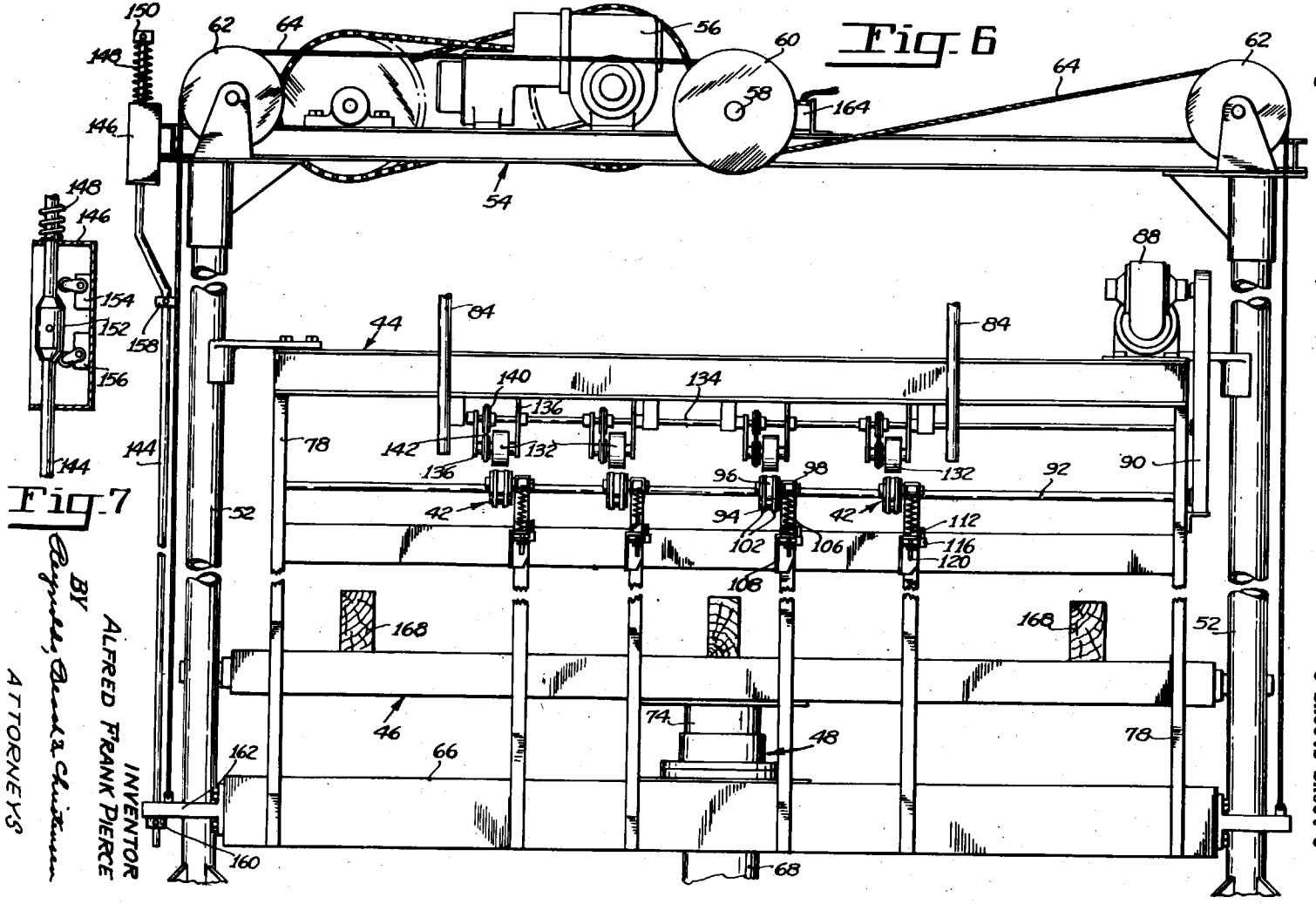
INVENTOR
ALFRED FRANK PIERCE
BY Reynolds, Bissell & Christensen
ATTORNEYS

SHEET HANDLING MECHANISM

Original Filed June 6, 1949 6 Sheets-Sheet 6

INVENTOR.
ALFRED FRANK PIERCE

BY
Reynolds, Bard & Christensen
ATTORNEYS

United States Patent Office

Re. 24,124
Reissued Feb. 28, 1956

24,124

SHEET HANDLING MECHANISM

Alfred F. Pierce, Olympia, Wash., assignor to American Manufacturing Company, Inc., Tacoma, Wash., a corporation of Washington Original No. 2,647,645, dated August 4, 1953, Serial No. 97,411, June 6, 1949. Application for reissue July 18, 1955, Serial No. 522,890

20 Claims. (Cl. 214—6)

Matter enclosed in heavy brackets [ ] appears in the original patent but forms no part of this reissue specification; matter printed in italics indicates the additions made by reissue.

In modern plywood factories presses of the multiplaten type, because of their large load capacity, are used almost universally for bonding the plywood *sheets* [panels]. In this type of press the [panels] *sheets* bonded are not arranged in a solid column or stack but are separated, individually or in groups, by a series of press platens supporting them, which can then apply heat directly to the individual [panels] *sheets* for activating the bonding adhesive used. Preferably unloading of the press is accomplished by discharging the entire load of *sheets* [panels] as a single group by sliding them edgewise off the press platens and into open shelves of a *conveying* receiving rack stationed adjacent to the offbear side of the press. This unloading technique enables putting the press back to work immediately on a fresh load of [panel] *veneer* stock, whereas the receiving rack can be unloaded and the [panels] *sheets* stacked during the ensuing period while the press is in operation.

In the past the unloading and stacking of [panels] *sheets* from the rack has been manual. However, as *such sheets* [they] were rather inconveniently disposed in the rack to be grasped and removed by hand, and are usually too large [and heavy] for one man alone to handle *conveniently,* this unloading and stacking operation required virtually the full time of two men working as a team.

My present invention relates [to a method and] to novel apparatus operating automatically in *handling sheets in a stack and coordinating the elevation of the top of a stack of sheets with sheet transfer means which move sheets edgewise, such as in* removing [the] panels *or sheets* from [the] *a conveying* receiving rack and stacking them in a desired location for removal by a lift truck or similar conveyance. The invention includes, among various features, [the method, the] *a double elevator assembly including one elevator carrying sheet transfer means and the other elevator carrying sheet stack supporting means, which may constitute an* automatic stacker, and the combination of such an [automatic stacker and] *elevator, transfer means and stack supporting means combination with vertically spaced conveying means shelves alongside such a combination* [a receiving rack cooperating therewith], the whole occupying a minimum of floor space.

As a further object the [stacking] *sheet handling* apparatus is compact, reliable in operation and comparatively inexpensive to manufacture and maintain. Moreover, it operates rapidly *as an automatic stacker* so that there is no delay between readiness of [the] *a* press, *for example,* to discharge a load of [panels] *sheets* into the *multiple-shelf conveying* rack and completion of the operation of unloading the preceding batch of [panels] *sheets from the shelves and stacking them.*

Still another and more specific object is to overcome the [evident] physical problem of *moving large* [withdrawing] [the expansive, heavy], yet flimsy, horizontally disposed [panels from between the] *sheets between conveyor shelves* narrowly spaced [shelves which they occupy in the rack, and transfer them to the top of a stack] *vertically and a stack of sheets on an elevator alongside such shelves, in either direction,* with minimum lost motion and delay. There are complications in doing this in that the *height of a* stack *of sheets on the elevator varies* [grows] progressively [from] *between* zero [to] *and* a selected height. Moreover, [the panels emerging] *individual sheets moved relative to* successive[ly] from the rack] *conveyor* shelves must [do so] *be so moved* at the different heights of such *respective* shelves. [It] *In unloading such shelves successively, for example, it* is obvious that if the emerging end of a [panel or panel group] *sheet at a considerable distance above the sheet stack* were allowed, unsupported, to droop increasingly in *the* process of emerging from a *narrow* rack space, the trailing end of the *sheet* [panel or group] would eventually spring upward against the rack shelf above it, halt*ing* the movement of the *sheet* [panel or group], and possibly caus*ing* damage. It is therefore evident that the [panels] *sheets* cannot simply be ejected haphazardly from the rack shelves, and allowed to drop as they may.

In light of these circumstances my invention comprises novel *sheet transfer* [panel unloading] and *sheet* stack[ing] *supporting* apparatus having adjustably elevated [conveyor] *sheet transfer* means cooperating with *conveying means shelves* [the receiving rack] and operable to move [the] *sheets* [panels] one after another edgewise *relative to* [from the rack] shelves *closely spaced vertically* in successive order, preferably commencing with the lowermost *shelf* and progressing to the uppermost *shelf, as the height* [panel on the rack, into position for deposit on top] of the stack of sheets varies [panels being formed]. Coacting with such [conveyor] *sheet transfer* means is a [panel] sheet stack[ing] *supporting* platform disposed adjacent to the [rack] *conveying shelves* and automatically adjusted in its elevation differentially in relation to the *sheet transfer* [panel conveyor] means, to maintain the top of the *sheet* stack at all times [just slightly below the changing elevation of the emerging panels] *at substantially the level of the sheet moving through the sheet transfer means.*

Preferably such elevated *sheet* transfer [conveyor] means is of the [continuous] *pinching or clamping type, incorporating an upper roller and a lower* belt, *for example,* or similar type, and [comprises] *may include* a horizontal row of [belt conveyors] *such units the belts of* which extend [lengthwise of the rack] into [its] shelf spaces *of the rack perpendicular to the direction of movement of the sheets* to engage the*ir* bottom faces [of the panels], lift them off their respective shelves and transport them edgewise therefrom to the stack, successively. In order to permit these [conveyor] *sheet transfer* elements to enter the rack spaces to engage and remove the [panels] *sheets* in that manner, and to allow the [conveyor] *transfer* elements to be elevated directly through the rack progressively from the level of one rack shelf to another, the rack shelves [are] *may be* constructed in [special] cantilever fashion.

A further feature of the invention resides in the provision of elevator means carrying both the *transfer* [conveyor] means and the *sheet* stack[-]supporting platform, the latter being carried by a jack which is preferably of the hydraulic type and valve-controlled automatically in response to operation of the [conveyor] *transfer* means transferring successive *sheets* [panels from the rack] to *or from* the stack [being formed] on such platform. In the illustrated and preferred case the valve-controlled loaded hydraulic jack is intermittently released to descend by gravity in incremental amount relative to the [conveyor] *transfer* means, such amount corresponding approximately to the thickness of a [panel] *sheet*, or group of [panels] *sheets*, carried by one shelf of the *conveying means rack* [loader], each time a [panel] *sheet* or [panel] *sheet* group is transferred to the stack on the platform. More particularly, the control valve which permits this incremental descent of the hydraulic jack is preferably controlled by mechanically actuated switch means set to open the hydraulic relief valve with the reception of each new [panel] *sheet* or [panel] *sheet* group on the top of the stack, and to close such valve automatically after the stack has descended a distance approximately equal to the increased height of the stack.

These and other features, objects and advantages of the invention will be understood better by reference to the following more detailed description and the accompanying drawings.

Figure 1 is a vertical sectional view of the combination *sheet* stack[ing] *supporting* mechanism and [receiving rack,] *conveying means shelf assembly* taken transversely thereof on line 1—1 in Figure 3, part of the *sheet conveying means assembly* [rack], shown in broken lines, being broken away; Figure 2 is a similar view showing the *sheet* stack[ing] *supporting* mechanism in a different operating position. Figure 3 is a horizontal sectional view of the same taken on line 3—3 of Figure 1.

Figure 6 is an end elevation view of the *sheet* stack[ing] *supporting* mechanism from its side facing the *sheet conveying means assembly* [receiving rack].

Figure 7 is a detail view of limit switch mechanism shown in Figure 6.

Figure 8:
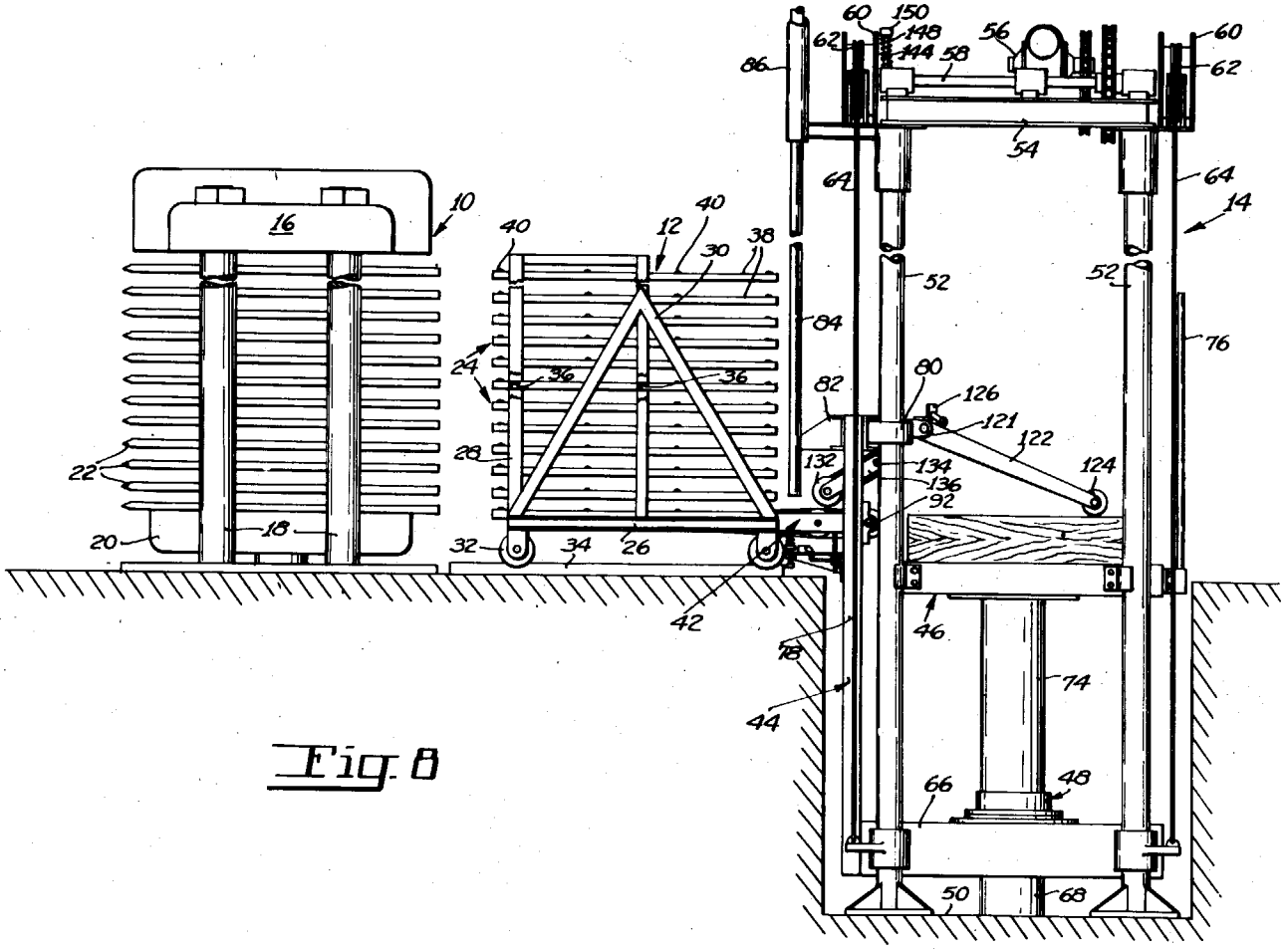
Figure 8 is a side elevation view of the *sheet conveying means assembly* [receiving rack,] indicating by broken lines the relation thereto of a multiplaten press and the *sheet* stack[ing] *supporting* apparatus.

In order to effectuate the purpose of the invention, in the illustrative case, the plywood *sheets or* panels discharged from the multiplaten press 10 (Figure 8) are received individually on separate *conveying means* shelves in a receiving rack 12 from which they are subsequently removed and stacked by the stacking mechanism designated 14. The *sheets or* panels, not shown in Figure 8, are designated "P" in other figures. The invention itself resides broadly in [the method of handling the panels after their discharge from the press into the receiving rack, and in] the combination *sheet conveying means, superposed shelf assembly* [receiving rack] and *sheet* stack[ing] *supporting* mechanism [implementing such method]. However, the invention is not limited in its application to the handling of plywood panels or to the handling of [plywood panels] *sheets* received from a pultiplaten bonding press, but extends to any similar type of situation involving the handling of *sheets*, panels or similar objects for *transfer relative to a* stack[ing purposes generally].

The multiplaten plywood bonding press illustrated in Figure 8 is of conventional form, generally comprising a stationary head or upper press block 16 supported by standards 18, a lower reciprocable press block or ram 20, usually hydraulically actuated, and a plurality of work separating platens 22 arranged in series between the upper block 16 and ram 20. The press is loaded by inserting stock for one or more *plywood sheets or* panels between each successive pair of platens 22 which are separated typically about three inches to receive the stock when the press is open. The hydraulic ram 20 is then raised to pick up the lowermost platen 22 carrying [panel] *veneer* stock, then the next successive platen and the next, progressively, one platen resting on the other with the plywood [panel] *veneer* stock interposed therebetween, until the press platens 22 and the [panel] *veneer* stock form a solid column which is pressed to the desired degree by ram 20, forced against press block 16 for the requisite bonding period. At the same time, heat may be applied to the [panels] *sheets* by the press blocks and individual platens to activate the bonding adhesive used.

When the press is opened by descent of the ram 20 to restore the original three-inch spacing between platens 22 the *pressed plywood sheets or* panels are discharged from the interplaten openings by suitable means (not shown) into the *respective conveying shelves of the* waiting receiving rack 12 stationed adjacent to the press. The height of a twenty opening press when open, between block 16 and ram 20, may be in the vicinity of ten feet, for example. This means that the receiving rack 12 must be of corresponding height, as the individual rack shelves 24 must lie approximately in horizontal registry with the individual press platens 22 to which they correspond if the [panels] *sheets* are to be transferred from the press to the rack by simply moving them horizontally edgewise, which is the preferred method.

With a receiving rack in the vicinity of ten feet in height above floor level, and with plywood [panels] *sheets* four feet by eight feet and larger, *perhaps* in groups [perhaps] as much as two inches thick, carried by the shelves of the rack to its full height, one may readily appreciate the difficulty of taking the sheets [panels] out of the rack and stacking them when done manually. By the present invention the receiving rack is constructed specially and cooperates with novel mechanism which automatically unloads the rack and stacks the *plywood sheets* [panels]. All of this is done in the few minutes between the time *pressed sheets are discharged from* the press [closes on a succeeding batch of panels] and *the time the press* later opens with *the next batch of* [those panels] *sheets* freshly bonded and ready to be discharged into the receiving rack.

While various details of the rack 12 are entirely optional in form, there are certain features about it which are important according to the practice of my invention. Of importance is the general construction of the rack shelves and the general manner in which they are supported from the rack framework. The rack framework itself is subject to considerable variation and consists in the present case of a base 26 and upright rectangular side frames 28 braced by diagonal members 30 connected to the base. For considerations of convenience not here important the base 26 has wheels 32 at its four corners which ride on supporting rails 34, extending lengthwise between the press and the stacking mechanism 14.

One vertical side of each rectangular rack frame 28 is situated at the end of the rack nearest the press 10. The other and parallel side of each such frame is situated generally intermediately between that end and the opposite end of the receiving rack. Between these vertical side members of the rectangular frame 28 on opposite sides of the rack extend a plurality of structural members 36, such as angle iron or the like, arranged horizontally and at vertical intervals corresponding to the spacing between platens 22 of the press 10 when the press is open. If the press with which the receiving rack is to be used accommodates twenty plywood [panels] *sheets*, then there will be at least twenty of these horizontal structural members 36 in each of the two vertical rows bridged between elements of the opposite frames.

These horizontal structural members 36 constitute supports for individual rack shelves or form a part thereof. Preferably such shelves are constructed in the manner herein illustrated (see Figures 8 and 3), comprising one or more longitudinal members 38 extending substantially the full length of the rack between its ends adjacent to the press and the stacking mechanism 14, respectively. The longitudinal members 38 in each shelf are spaced apart widthwise of the rack at suitable intervals for a purpose to be explained later herein. They are each connected to the two horizontal structural members 36 of the rack for such shelf, and project cantilever fashion a substantial portion of their length from their intermediate point of support, namely, on the intermediately located structural member 36, toward the end of the rack adjacent to the stacking mechanism 14.

As much as one-half or more of the total length of members 38 may project in this manner, their free ends not being connected in any manner to each other or to any other part of the rack, so that endwise of the rack, viz. from press 10 to stacking mechanism 14, the shelf spaces are completely open throughout, and heightwise the rack is similarly unobstructed in that portion of its length between the projecting ends of the cantilever shelf members 38 and their generally intermediate points of support. Preferably the number of such longitudinal members included in each rack shelf is no greater than necessary, and they are distributed, to provide ample support to the freshly bonded plywood [panels] *sheets* discharged from the press, without excessive sagging of the [panels] *sheets* between supporting rack elements.

The [panels] *sheets* moving from the press onto the rack shelves cannot move edgewise far out of line laterally because of the presence of the rectangular side frames 28 of the rack, which serve as retainer guides, although they will usually not be contacted by the *sheets* [panels]. Each of the longitudinal shelf members 38 carries *sheet conveying means illustrated as* a plurality of rollers 40 to support the [panels] *sheets* and [minimize friction in sliding the panels] *transport them* on and off the rack shelves. The shelves are, in the illustrated case, of such proportions that the longitudinal dimension of the [panels] *sheets* supported thereby extend widthwise of the rack, so that a long edge of the [panel] *sheet* is its leading edge in moving through the rack from the press toward the stacking mechanism 14, *but such sheet orientation is not essential.*

Figure 3:
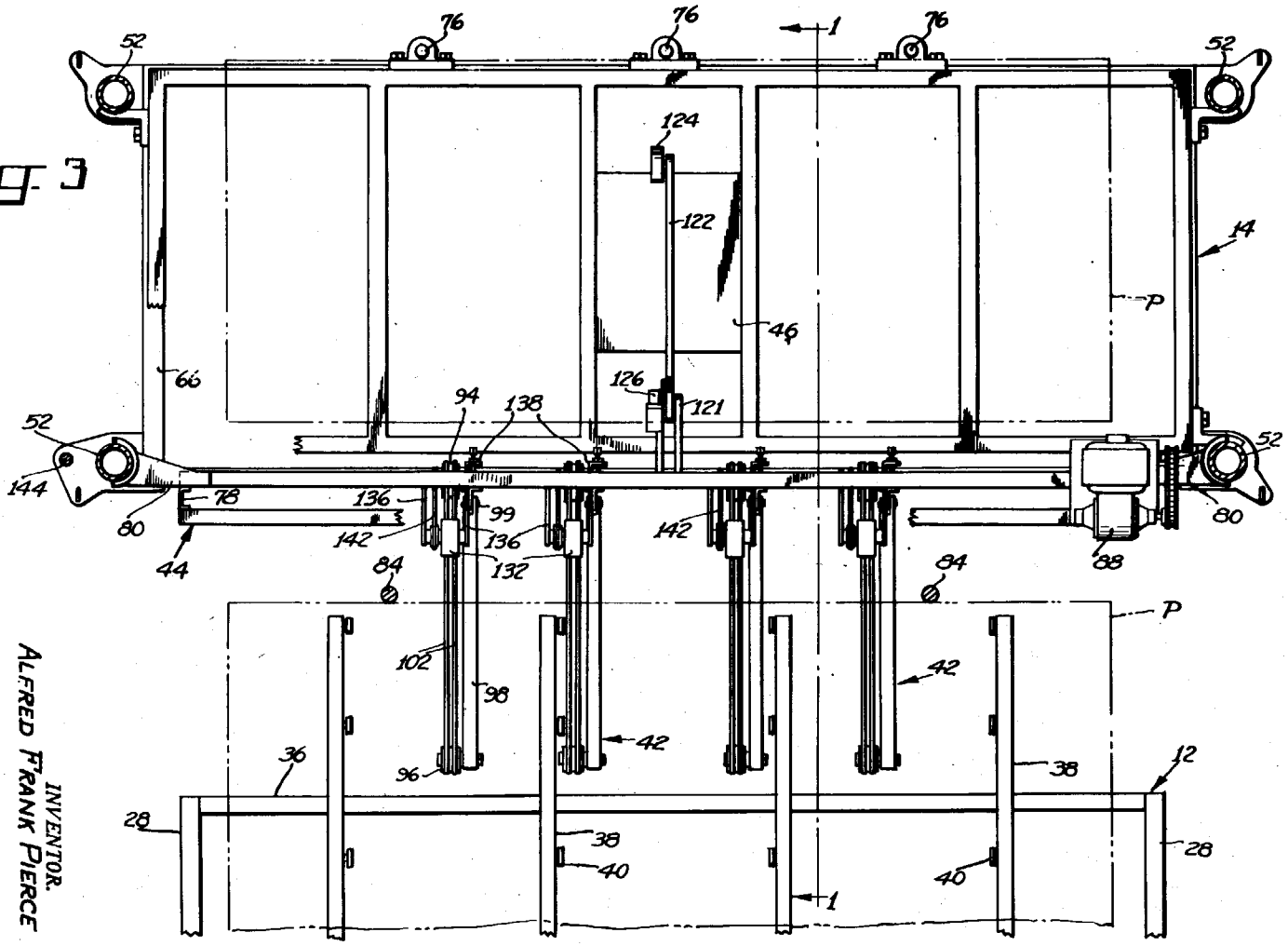

The *sheet transfer* [stacking] mechanism includes a plurality of generally horizontal [conveyors] *transfer units* 42, preferably of the *sheet pinching* [belt] type, arranged *for disposition in* substantially [in] horizontal registry *with the respective sheet conveying means shelves in succession* and carried for bodily movement up and down through the open spaces between the cantilever elements 38 comprising the rack shelves. As shown in Figure 3, four of these [conveyors] *transfer units arranged in a horizontal row* are employed, located at intervals across the width of the receiving rack 12. Their function is to engage the underside of a *sheet* [panel] *P*, or a group of *sheets* [panels] on a *single* rack shelf, and transfer the [panel] *sheet* or [panel] *sheet* group from such shelf to the top of a stack S of *sheets on sheet stack supporting* [panels being formed by the stacking] mechanism, as will be explained. Generally these [conveyors] *transfer units* 42 extend lengthwise of the [rack far enough into] *direction of movement of the sheets in* the rack shelf spaces *far enough* so that when they engage the underside of a [panel] *sheet* and lift it from the rack the [conveyor] *transfer unit* belts will carry a sufficient part of the total weight of the [panel] *sheet* and contact a sufficient surface area thereof to draw the *sheet along the conveying means* [panel from its remaining support] on the shelf [and set it into motion on the conveyor belts] toward the stack. These [conveyors] *transfer units* 42 are mounted on the side of an elevator [cage or] frame 44 *alongside the sheet conveying rack shelves* to project *the belts* cantilever fashion into the rack shelf spaces, interdigitated with the cantilever shelf supports 38 (Figure 3), and to be moved up and down by such elevator.

The *sheet* stack[ing] *supporting* mechanism also includes a [panel stacking] platform 46 carried by a jack 48 which in this case is preferably a hydraulic jack mounted directly in the base of the elevator frame 44, as shown *in* [(] Figure 1 [)]. Initially the *sheet* stack[ing] *supporting* platform 46 is positioned by the hydraulic jack 48 on the elevator frame *at substantially the same level as, and preferably* slightly below, the level of the belts [conveyors] *of the transfer units* 42. When the stacking operation is to be commenced, the *transfer* belts [conveyors], thus positionally related to the platform, are disposed by the *lower* elevator *66* in their lowermost position, namely, [beneath] *in registry with* the bottom [panel or panel group P] *conveying shelf* in the [loaded] *sheet conveying* rack *assembly*. The [conveyor] *transfer* belts are then started and the *lower* elevator, carrying *such belts* [the conveyors], the *sheet* stack[ing] *supporting* platform and jack, *is* gradually raised, *either uninterruptedly or step-by-step distances equal to the shelf intervals, so that* [until] the [conveyor] belts engage first the *sheet* [panel] load in the bottom rack space, then that in the next, and so on to the top *shelf* of the [stack,] *rack. During such movement the transfer belts* successively transfer[ring] *from the rack* individually each such *sheet* [panel] load as engaged [from the rack] and deposit[ing] *such loads* [them all] successively in a stack on the *sheet* stack[ing] *supporting* platform 46 as the elevator *66* continues to rise. When finally the uppermost [panel] *sheet* load is removed from the rack, travel of the elevator mechanism *66* is automatically reversed and the entire elevated mechanism lowered until the [conveyors] *transfer belts 42* have descended to their initial positions at the base of the rack ready for commencing the unloading of the next batch of [panels] *sheets* therefrom.

During the time the [conveyors] *transfer units 42* are ascending [through] *relative to* the rack [spaces] *shelves* successively to unload the *sheets from them,* [panels] the *sheet* stack[ing] *supporting* platform 46 supported by the jack 48 is being lowered by increments [on] *by such jack relative to* the elevator frame *66 and the transfer means 42* [in relation to the conveyors], so that, as the [growing] stack of *sheets* [panels] on the platform increases in height, the top of such stack will nevertheless be maintained *always substantially* at [a] *the* level *of such transfer means* [always slightly below that of the ascending conveyors]. Thus, the [panels] *sheets* transferred by the *transfer means* [conveyors] do not have to drop or tilt downward appreciably in *being placed* [coming to rest] on the stack. Moreover, the top of the stack will never be so high as to obstruct such transfer. After the stack has [grown] *been built up* to the desired size, perhaps comprising two or three press loads of *sheets* [panels], it may be removed from the *sheet* stack[ing] *supporting* platform by a lift truck or similar conveyance and a new stack commenced. At that time the *sheet* stack[ing] *supporting* platform is [restaged] *reset* in relation to the [conveyors] *transfer means* so that the *top of the* platform will again be located *at substantially the same* [only slightly below the] level [of] *as* the [conveyors] *transfer means,* prepared to receive the lowest [panel] *sheet* in the receiving rack.

Figure 1:
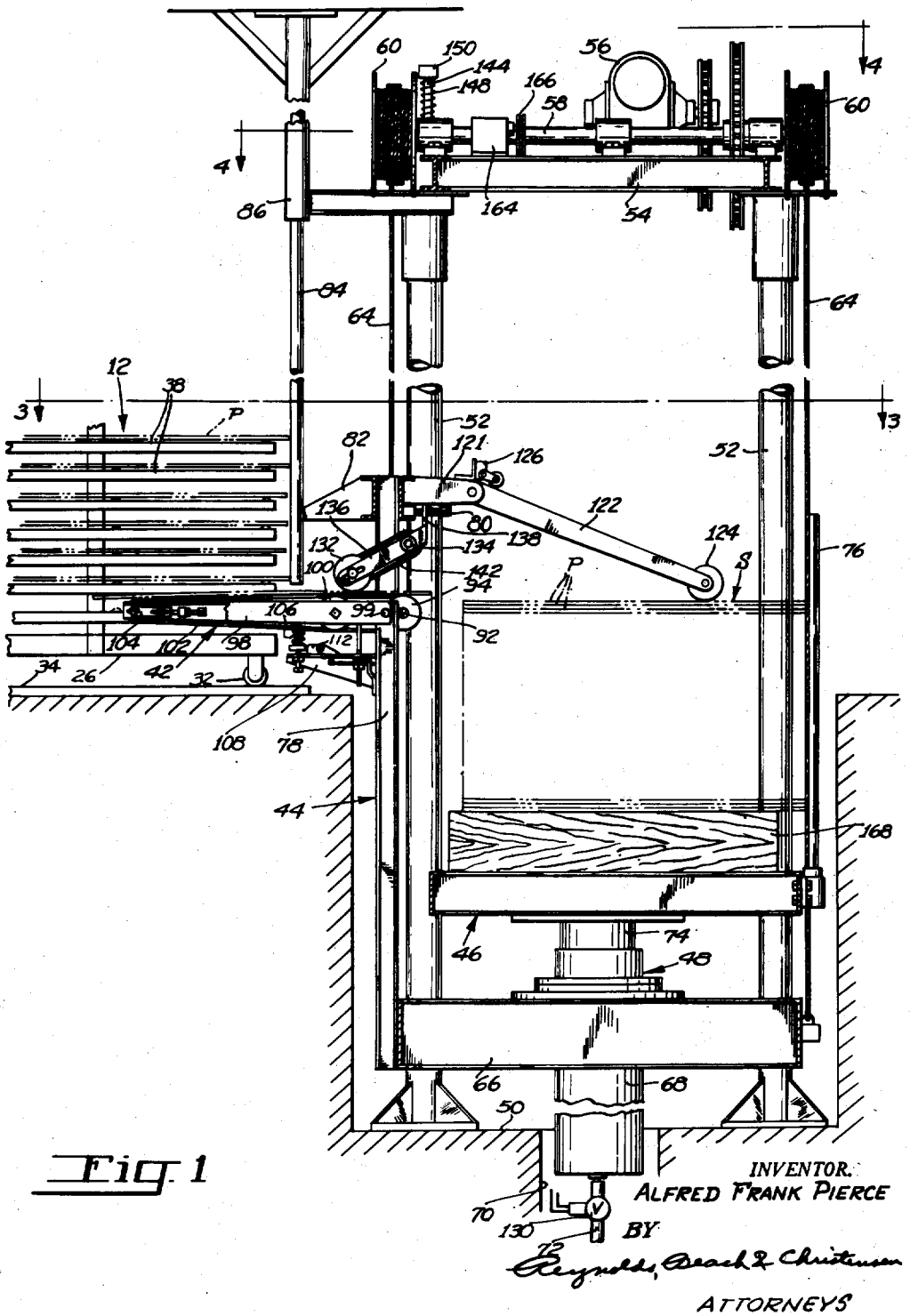

Having in mind these general features of the apparatus certain other details of construction and operation of its illustrated form will now be explained. Because it is usually convenient to mount the press and to support the receiving rack at floor level, it is necessary to mount the elevator mechanism on a sub-floor 50 (Figure 1). The elevator [frame] *guide structure* consists of four corner posts 52 which extend from the sub-floor 50 to a height somewhat above the top of the receiving rack and serve as guides for travel of the elevator frame 44 and stacking platform 46 movable differentially in relation to such frame. At its top the elevator framework is completed by a suitable girder structure 54 which spans between the four posts to constitute a support for the elevator hoist mechanism. The latter includes an electric motor drive unit 56 (Figures 1 and 6) connected by a chain and sprocket transmission to a central drive shaft 58 which rotates two cable drums 60, one at each end. At the four corners of the top of the elevator framework are located cable guide sheaves 62, over which run the hoist cables 64 connected to the corners of the base of the elevator cage, as shown in Figures 1 and 6, for example. The hoisting mechanism as such is rather conventional and should require no further description.

The minimum height dimension of the elevator frame [or cage] 44 between its base 66 and the mounting location thereon of the *sheet transfer means* [conveyors] 42 is governed primarily by the desired maximum height of a stack of [panels] *sheets* to be accumulated on the *sheet* stack[ing] *supporting* platform 46. The length of the barrel or cylinder 68 of the hydraulic jack 48 will be governed by substantially the same considerations. This hydraulic cylinder, mounted on the elevator base, projects downwardly therefrom and is accommodated in a sub-floor pit 70 in the lowered position of the elevator *frame* 44. The cylinder is of the single-ended type, having a fluid conduit connection 72 (Figure 1) only at its bottom end and a solenoid actuated control valve 130 in such fluid conduit to control actuation of the hydraulic piston 74 cooperating with such cylinder, whereby to establish the height of the *sheet* stack[ing] *supporting* platform on the [cage] *frame* 44 and in relation to the [conveyors] *sheet transfer means* 42.

The details of the *sheet* stack[ing] *supporting* platform 46 and the elevator frame [or cage] 44 are not especially pertinent to an understanding of the invention. Suffice it to say that the elevator, the *sheet* stack[ing] *supporting* platform, and the base *66* of the elevator [cage] *frame* are suitably constructed to carry their respective loads, and are suitably guided for vertical travel on the corner guide posts 52. On its end remote from the receiving rack the *sheet* stack[ing] *supporting* platform preferably carries two or more upright rods 76 which serve as stops for the [panels] *sheets* sliding across the top of the stack being formed on the platform, carried by momentum from the belts [conveyors] 42 to [their rest positions on] the stack. At its end adjacent to the receiving rack the elevator [cage] *frame 44* embodies a vertical framework 78 (Figure 6) which supports the *transfer* belts [conveyors] *42* and certain other mechanism near its upper end, and which has suitable slide elements 80 (Figure 8) at each end by which it is guided from cornerposts 52 for vertical travel.

The upper end of this framework 78 carries projecting arms 82 which actuate slide rods 84 for movement up and down with the elevator. The upper ends of these slide rods telescope within cylindrical guide tubes 86 supported from the ceiling and braced laterally from the elevator *guide structure* [framework], as shown [(] *in* Figure 1 [)]. These rods serve as stops to prevent [panels] *sheets* discharged from the press into the rack overtraveling the *conveying* rack shelves by momentum in the direction of the *sheet* stack[ing] *supporting* mechanism. They do not interfere with transfer of the [panels] *sheets* from the rack to the [panel] stack by belts [conveyors] 42 because their lower ends are maintained a short constant distance above the tops of *such* [the conveyor] belts to clear the [panels] *sheet or sheet group* thereon [, and because] *by mounting* the rod-supporting arms 82 [are mounted] on [and move vertically with] the *elevator vertical* [conveyor-supporting] framework 78 *for movement vertically therewith.*

As shown in Figure 6, *the framework* [this portion] 78 of the elevator [cage or] frame 44 carries at its top an electric motor drive unit 88 connected by a transmission chain and sprocket, encased in a guard 90, to a countershaft 92 which extends the width of such [elevator] frame*work* [portion,] and is journaled thereon. This countershaft rotates [belt conveyor] drive pulleys 94 (Figure 5)[in each of] *engageable with* the respective *sheet transfer* belts [conveyors] 42. As shown best in this figure, each belt [conveyor] additionally *embraces* [includes] a guide sheave 96 journaled at the outer end of a supporting arm 98 which is pivotally supported on the elevator *vertical* [cage] framework 78 by pivot 99 for swinging about a horizontal axis defined thereby. This arm carries a second belt guide sheave 100 at an intermediate location between pulleys 94 and 96. The conveyor belt 102 passes around all three of these sheaves which locate its upper stretch appreciably above the top of the arm or any other parts carried thereby which might tend to interfere with free movement of the [panels] *sheets* carried by the belts. Belt tension is maintained or adjusted by providing the guide sheave 96 with an adjustable journal support 104 to establish its position lengthwise of the arm.

The arm 98 is mounted pivotally on pivot 99 in the manner described as a protective or safety feature. In the absence of special provision, should a [panel] *sheet* being transferred from the rack to the stack on the elevator platform by the *transfer* belts [conveyors] be interrupted for any reason and fail to move clear of the rack before the progressively ascending belts [conveyors] 42 raise the [panel] *sheet* so far as to contact the rack shelf next above, there will be a complete blockage in operation of the [stacking] *sheet handling* mechanism because the stopping of the [panel] *sheet* in that intermediate position will check further ascent of the elevator. The special provision which circumvents any such possibility comprises yieldable supports for the pivoted belt conveyor arms *98* which normally hold such arms generally level, but which can yield if necessary to allow for some additional ascent of the elevator [cage] *frame 44* even after a panel becomes caught between a rack shelf and the *transfer* belts [conveyor] in the manner previously indicated, without damage to the mechanism as a whole. The yieldable support for a cantilever [conveyor] *belt* arm (Figure 5) comprises a spring 106 reacting upwardly against the arm from a support bracket 108 to maintain the arm normally in horizontal position projecting its [conveyor] belt endwise into the receiving rack. The arm's position may be varied by means of a support 110 adjustable for raising and lowering the base end of the spring as desired.

Figures 4, 5:
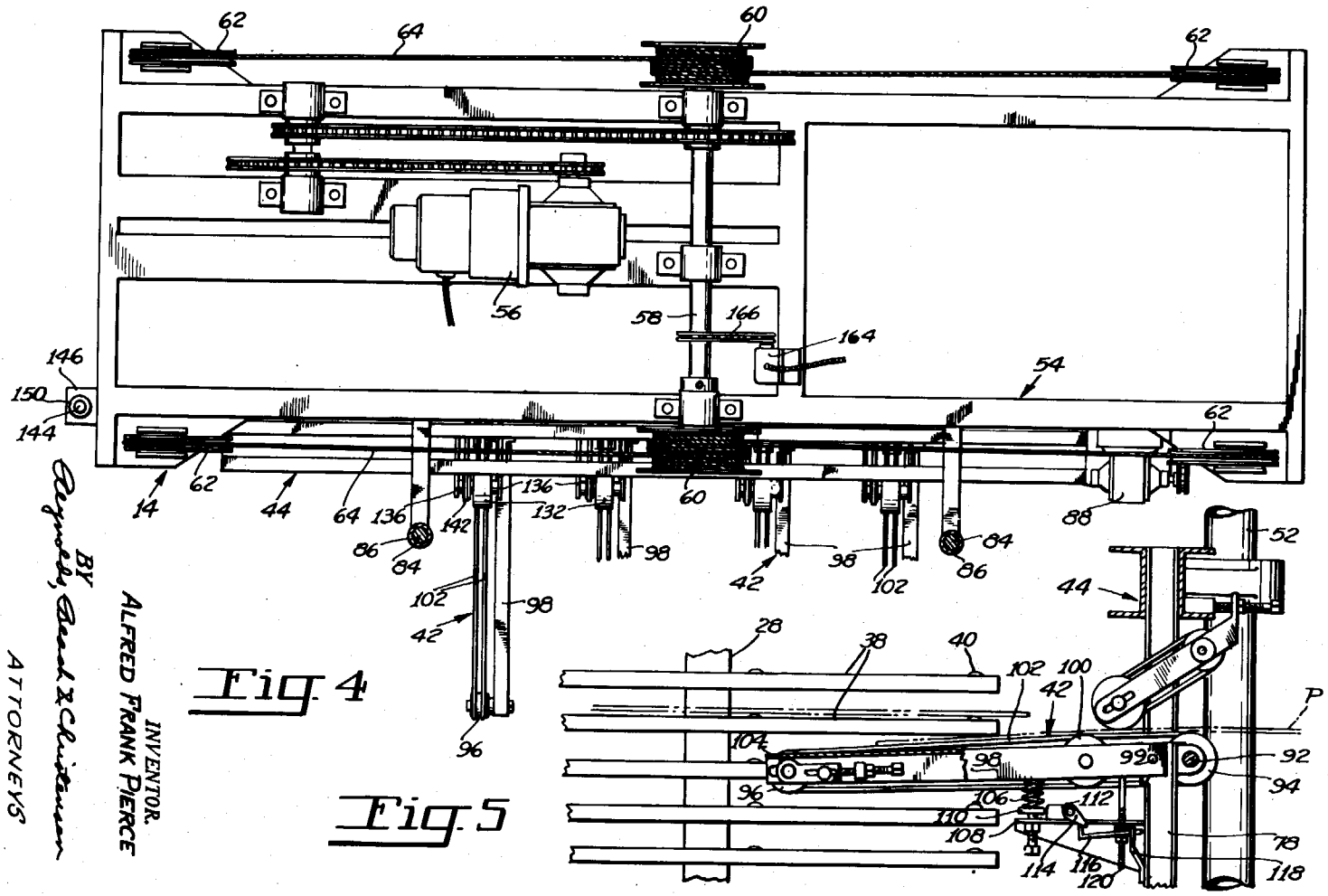
Figure 4 is a horizontal sectional view of the *sheet* stack[ing] *supporting* mechanism taken on line 4—4 in Figure 1, parts, such as of the [panel conveyor elements] *sheet transfer units*, being broken away for convenience in illustration.
Figure 5 is an enlarged detail of a portion of the *sheet* stack[ing] *supporting* mechanism and [receiving rack] *sheet conveying means assembly* as shown in Figure 2.

In addition, the precautionary support construction of the *transfer* belt [conveyors] *units* includes a safety switch 112 arranged to be actuated by excessive downward deflection of a [conveyor] *belt* arm in the event of a [panel] *sheet* P being caught between the belt [conveyor] and the rack shelf next above the [panel] *sheet on it,* as shown in Figure 5. This switch 112 is included in the energizing circuit (not shown) for the elevator hoist motor 56; preferably also in the energizing circuit for the belt [conveyor] *drive* motor 88. The motor-energizing circuits may be conventional and need no illustration herein. The switch may include a control lever 114 actuated by an arm 116 whose base end is pivoted on a supporting bracket 118. This actuating arm is depressed by a rod or bolt 120 interconnecting the same with the [conveyor] *belt* arm 98 so that as the latter is forced to swing down by a predetermined amount relative to the elevator cage, the actuating arm 116 releases the lever 114 of switch 112, which is spring-pressed toward open position and deenergizes the electric motors operating the [stacking] *sheet handling* mechanism. Preferably each of the four *transfer* belt units [conveyors] and supporting parts thereof have similar switch mechanism since it is possible that blockage of the ascent of only one of the belt [conveyors] *units* may take place while the others are free to rise, and it will be just as desirable to stop the motors in that event as in the case where all are blocked.

Figure 2:
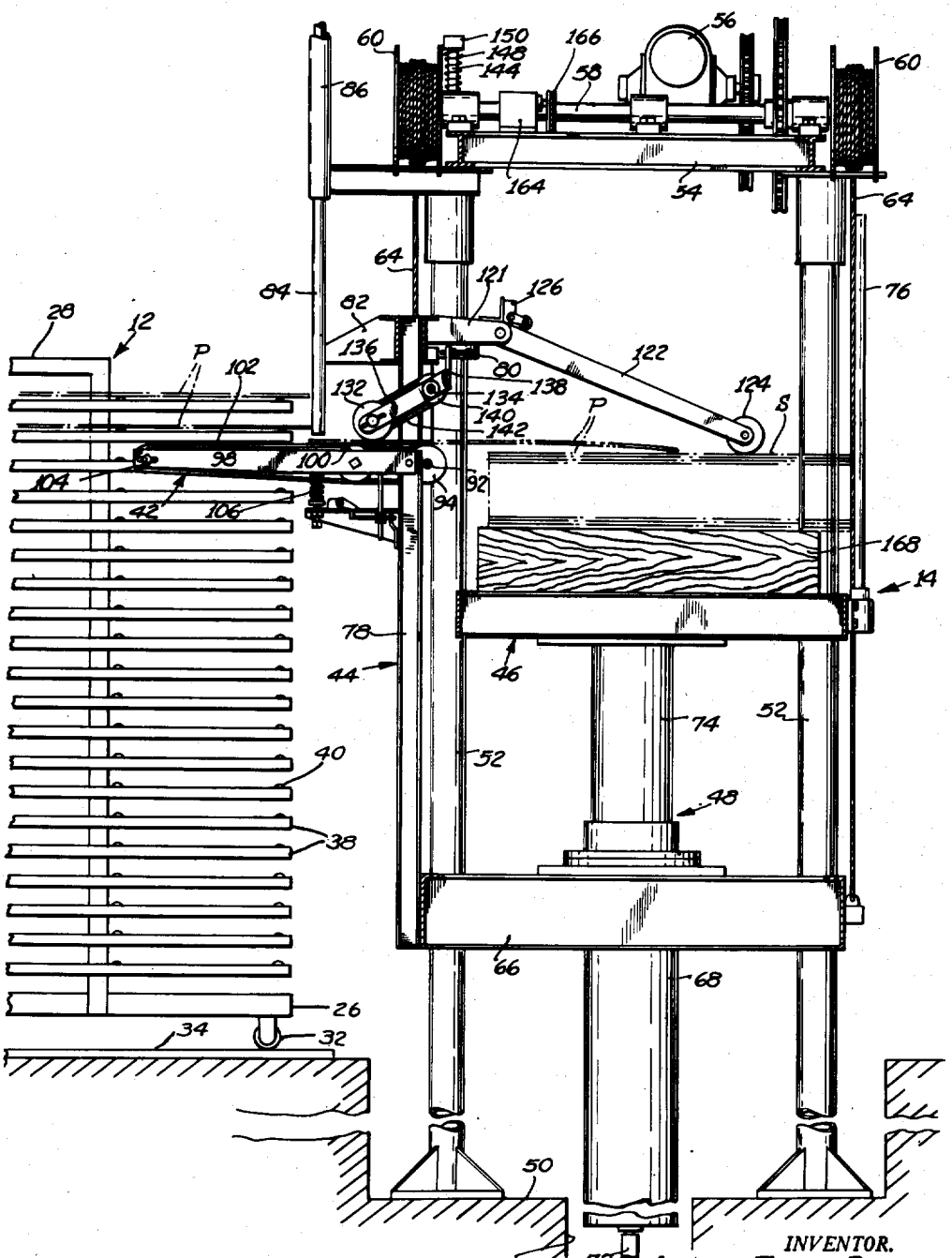

A greater degree of positiveness in the conveyance or transfer of [panels] *sheets* from the rack to the *sheet* stack[ing] *supporting* platform is obtained by provision of *pinching or clamping type sheet transfer means including in combination with the sheet transfer belts* arm-supported driven hold-down *or pinch rolls* [rollers] 132, shown in Figures 1 and 2, which press the *sheet* [panel]

or [panel] *sheet* group down against the *respective* belts [conveyors] 102 and cooperate with such [conveyors] *belts* in moving [it] *the sheet or sheet group,* after [being] *it has* moved far enough from the rack to pass beneath such rolls. These roll[er]s are belt-driven from pulleys 140 on a countershaft 134 (Figure 6), driven by the same chain mechanism which drives countershaft 92 from drive unit 88. Such countershaft also serves as the support for arms 136 which carry the roll[er]s 132. These arms are free to swing downward toward their respective belt conveyors 102, being journaled on shaft 134, but are limited in their downward displacement so that the roll[er]s 132 cannot actually contact or wedge past the [conveyor] belts beneath them, although they can readily press against the top of a [panel] *sheet* resting on such belts. The[ir] lowermost position *of the rolls 132* is established by an adjustable stop 138 (Figure 2). The arms are swung downward affirmatively and their roll[er]s 132 forced against the [panel] *sheet* producing a firm grip on the [panel] *sheet* when being transferred[,] by virtue of the torque applied to the arms *136* as an inherent result of the turning of the belt drive pulleys 140 which drive the roll[er] drive belts 142. Such rotation of the arms *136* is resisted by a [panel] *sheet* on the belt*s* [conveyors] 102, or by the stop 138 when no [panel] *sheet* is interposed between the *belts 102* [conveyors 42] and the roll[er]s 132.

The upper end of the elevator [cage or] frame 44 also carries a bracket 121, shown in Figure 2, to which a control arm 122 is pivotally connected. This swingable arm extends laterally over the *sheet* stack[ing] *supporting* platform 46 and carries a roller 124 at its swinging end, which is adapted to rest directly on top of the stack of [panels] *sheets* being formed on the *sheet* stack[ing] *supporting* platform. The supported end of the arm is arranged to actuate a switch 126 which operates the solenoid valve 130 (Figure 1). The arm has a normal position in which such switch is open and the solenoid valve closed to prevent discharge of hydraulic fluid from the cylinder 68, and thereby maintain at a constant elevated position the jack and *sheet* stack[ing] *supporting* platform relative to the elevator [cage] *frame*. However, if the arm is raised slightly, namely, by the thickness of a *sheet* [panel], from this normal position, it closes the switch 126 which opens the solenoid valve 130 to allow discharge of hydraulic fluid from the cylinder, enabling the platform to descend by its own weight on the jack.

As the platform descends the arm 122 *carrying roller 124* resting on *top of* the stack of [panels] *sheets* swings downward, and after its swinging end has descended an amount approximately equal to the increase in height of the [panel] stack the switch 126 is again opened and the discharge of fluid from the cylinder cut off. It will therefore be evident that each time a *sheet* [panel] or [panel] *sheet* group moves from the belt*s* [conveyor] onto the stack and slides beneath the roller 124 it raises the swinging end of arm 122 to close the valve control switch 126, and initiates descent of the jack. By this means the top of the stack of *sheets* [panels] on the *sheet* stack[ing] *supporting* platform 46 is always maintained *at the level of or just* slightly below the level of the *transfer* belt*s* [conveyors], as desired.

The upper and lower limits of travel of the elevator [cage] *frame* and *transfer units* [belt conveyors] carried thereby are established by means of limit switch mechanism illustrated in Figures 6 and 7. Such mechanism includes a switch control rod 144 extending generally the height of the elevator structure. The weight of this rod is carried at its upper end by support means including a switch box 146 having apertures through which the rod is guided for limited vertical displacement, and a spring 148 reacting against a fixed collar 150 at the upper end of the rod to urge such rod normally into an upwardly displaced position. Inside the switch box 146 the rod carries a cam sleeve 152 constituting a switch-actuating element. Two switches are arranged inside the switch box, an upper switch 154 arranged to be actuated by the sleeve 152 upon upward movement of the rod 144 to reverse the electric motor operating the hoist mechanism, and a lower switch 156 arranged to be actuated by such sleeve 152 to stop the hoist motor by downward displacement of such rod. The straight portion of the rod depending form the switch box carries thereon two fixed collars, an upper collar 158 and a lower collar 160, spaced apart by the desired length of travel of the elevator *frame 44*. The base *66* of the elevator [cage] *frame* has an element 162 *shown in Figure 6* which projects laterally therefrom to slide over the section of rod 144 between these collars, and raise and lower the rod by contacting the collars 158 and 160, respectively.

During ascent of the elevator *frame 44* [cage], when the abutment element 162 strikes the upper fixed collar 158 it thereby raises the control rod 144, which trips the switch 154 and reverses the electric motor driving the hoist mechanism, to cause the elevator to descend. When the elevator [cage] *frame* approaches the desired lowermost position this abutment strikes the fixed collar 160 and, against the force of spring 148, depresses the control rod 144 to actuate the switch 156 and stop the hoist drive motor. The drive motor can then be started again only by external means, such as by a separately controlled switch of the push-button type which will be depressed momentarily by hand at a desired later time, by-passing the switch 156 in a suitable hoist motor energizing circuit, until the elevator [cage] *frame* has ascended again sufficiently to break the engagement of abutment 162 with collar 160 which had been held depressed by the abutment to hold switch 156 open. It will be obvious that various other control arrangements could be utilized to control stopping and starting of the elevator and to limit its vertical travel in either direction.

As an added precaution, or in lieu of limit switches 154 and 156, I may provide an additional limit switch 164 (Figure 4), the same to be driven by a chain 166 synchronously with the hoist drive shaft 58. The switch 164 may be so constructed and arranged that after a predetermined number of rotations of hoist drive shaft 58 in one direction or the other to the desired extreme positions of corresponding travel of the elevator [cage] *frame* 44, the switch will operate to reverse or deenergize the hoist motor in unit 56, as desired.

In general, it will be evident that the invention is not confined to the particular embodiment herein illustrated or to the details of such embodiment, but may assume various forms. For example, any elevator or hoist mechanism which causes the *sheet* stack[ing] *supporting* platform and the *sheet* transfer [conveyors] *units* to be elevated differently in order to maintain the top of the stack of [panels] *sheets* on the *sheet* stack[ing] *supporting* platform even with or a desired distance below the level of the *sheet* transfer *means* [conveyors] at all times may be employed. That is the important thing, although the preferred manner of implementing it is that illustrated in which the hydraulic jack or other means supporting the *sheet* stack[ing] *supporting* platform is mounted directly on the elevator means which carries the *sheet* transfer *means* [conveyors]. Another and perhaps more obvious way of obtaining relative elevation of platform and *sheet* transfer [conveyors] *means* would be by use of a jack mounted stationarily and coordinated with movement of the elevator carrying the *transfer means* [conveyors]. Likewise, other forms of transfer *means* [conveyors] may be employed to remove the [panels] *sheets* from the receiving rack and deposit them in a stack on the platform.

Moreover, in connection with the manner in which the

[conveyors] *sheet transfer means* and *sheet* stack[ing] *supporting* platform are elevated, it will be evident further that the hoist mechanism raising the elevator *frame* [cage] 44, hence the *sheet* transfer *units* [conveyors] 42, need not be operated continuously, but may be caused to operate by progressive increments, so that the *sheet* transfer [conveyors 44] *units 42* will be elevated *intermittently* in stages *or increments,* stopping at each *conveying* [receiving rack] shelf long enough to transfer [the panel] *a sheet* or [panel] *sheet* group *relative thereto, such as from such shelf* [supported thereon] to the *sheet* stack[ing] *supporting* platform, and then moving up to the next shelf, etc. Likewise, the *sheet* stack[ing] *supporting* platform supporting jack need not be lowered by increments each time a single [panel] *sheet* or [panel] *sheet* group is transferred to the stack, but may be lowered in larger steps initiated with the reception each time on the stack of an additional predetermined number of *sheets* [panels] or layers. Alternatively, the *sheet* stack[ing] *supporting* platform could be lowered relative to the *sheet* transfer *means* [conveyors] at a generally constant rate, whether the transfer [conveyors] *belts* were to be raised by increments or steadily. It is important, however these two principal moving elements may be motivated, that the top of the stack of [panels] *sheets* be kept always *level with or* below the level of the transfer *means* [conveyors], but not so far below that level that the [panels] *sheets* must drop excessively in moving from the transfer [conveyors] *means* to the top of the stack. Otherwise they might be damaged or become caught and obstruct operation of the system.

As a matter of convenience in removing the stack of [panels] *sheets* from the *sheet* stack[ing] *supporting* platform, I prefer to lay a group of skids or spacers 168 (Figures 2 and 6) on top [the stacking] *of such* platform to serve as the support for the [panels] *sheets* thereon. These skids are oriented parallel to the direction of movement of the [panels] *sheets* onto the stack, so that a lift truck or similar conveyance can pick up the stack by inserting its lift fork beneath it.

I claim as my invention:

1. *Sheet* [Panel] stacking apparatus comprising a *sheet* stack[ing] *supporting* platform, means operable to deliver *sheets* [panels] at depositing locations directly above said platform at various elevations for stacking on said platform, and platform support means operable to adjust automatically the elevation of said platform in relation to the height of the stack of *sheets* [panels] on said platform and the elevation of the location for delivery of each particular *sheet* [panel] by said delivery means, to dispose the top of the stack not more than a predetermined small distance below each such *sheet* [panel] delivery location irrespective of the elevation thereof.

2. *The sheet* [Panel] stacking apparatus defined in claim 1, wherein the *sheet* [panel] delivery means comprises *transfer* [conveyor] means operable to transfer *sheets* [panels] edgewise in a generally horizontal direction to [the delivery] *a depositing* location, and [conveyor] elevator means carrying said [conveyor] *transfer* means and guided for vertical movement to vary the operating height thereof.

3. *The sheet* [Panel] stacking apparatus defined in claim 2, wherein the platform support means is carried by the [conveyor] elevator means.

4. *The sheet* [panel] stacking apparatus defined in claim 2, wherein the platform support means is carried by the [conveyor] elevator means and comprises a hydraulic jack, and means controlling said jack to effect descent of the platform by successive increments automatically in response to successive [panel] *sheet* deliveries by the [conveyor] *transfer* means to the top of the stack on the platform.

5. *Sheet* [Panel] stacking apparatus comprising a *sheet* stack[ing] *supporting* platform, a [panel] *sheet*-supporting rack disposed adjacent to said [stacking] platform and having a vertical series of [panel] *sheet*-receiving [shelf] *shelves defining* spaces opening edgewise toward the space above said platform, [panel conveyor] *sheet transfer* means operable to engage and transfer a [panel] *sheet* in the lowermost shelf space to the platform for depositing the same thereon, said platform normally being [disposde] *disposed* in elevation *such that the top of the the sheet stack thereon is* slightly below said lowermost shelf space, elevator means operable to elevate said [conveyor] *transfer* means progressively so *as* to engage and transfer, one after another, successively, [panels] *sheets* supported in the higher shelf spaces of said rack to the stack of [panels] *sheets* on said platform, means supporting said platform and operable to lower the same relative to said [conveyor] *transfer* means, and control means, actuated automatically in response to operation of said [conveyor] *transfer* means to transfer a [panel] *sheet* to the platform stack, to operate said platform supporting means to lower said platform progressively relative to said [conveyor] *transfers* means during successive transfer of [panels] *sheets* to the platform stack, in such manner that the top of said stack is maintained within a predetermined maximum distance below the [conveyor] *transfer* means during progressive elevation thereof to engage and transfer the [panels] *sheets.*

6. [Panel] *Sheet* stacking apparatus comprising a *sheet* stack[ing] *supporting* platform, a [panel] *sheet*-supporting rack disposed adjacent to said [stacking] platform and having a vertical series of [panel] *sheet*-receiving [shelf] *shelves defining* spaces opening edgewise toward the space above said platform, [panel conveyor] *sheet transfer* means operable to engage and transfer a [panel] *sheet* in the lower[most] shelf space to the platform for depositing the same thereon, said platform normally being disposed in elevation *such that the top of the sheet stack thereon is* slightly below said lowermost shelf space, elevator means operable to elevate said [conveyor] *transfer* means progressively so *as* to engage and transfer one after another, successively, [panels] *sheets* supported in the higher shelf spaces of said rack to the stack of [panels] *sheets* on said platform, hydraulic jack means carried by said elevator means and supporting said platform, fluid actuating means for said jack *means,* operable to lower said [hydraulic] jack *means* and *said* platform, and control means, actuated intermittently by operation of said [conveyor] *transfer* means to transfer a [panel] *sheet* to the platform stack, to operate momentarily said fluid actuating means and thereby to lower said platform progressively by increments during successive transfers of [panels] *sheets* to the platform stack, in such manner that the top of said stack is maintained slightly below the [conveyor] *transfer* means during progressive elevation thereof to engage and transfer the [panels] *sheets.*

7. [Panel] *The sheet* stacking apparatus defined in claim 6, wherein the fluid actuating means comprises a control valve, and the control means comprises a valve-operating means and a control member cooperating with said valve-operating means, said control member being mounted on the elevator means for movement between a lowered position resting on the top [panel] *sheet* [on] *of* the platform stack, in which position said control member and valve-operating means controlled thereby operatively position said control valve to restrain lowering of the [hydraulic] jack *means* relative to the elevator means, and a raised position effected by transfer thereunder of a succeeding [panel] *sheet* to the top of the stack, *movement of said control member to such raised position being effective to move* [to reposition] said control valve for lowering of the [hydraulic] jack *means,* the platform [and], the stack of [panels] *sheets* thereon and said control member [into] *until* the [latter's] *control member again reaches its* lowered position to position said *control* valve again in its jackrestraining position, incremental lowering of the [hydraulic] jack *means* occurring in such manner with each transfer of a [panel] *sheet* to the stack.

8. [Panel] *The sheet* stacking apparatus defined in claim 6, wherein the fluid actuating means comprises a solenoid-controlled normally closed hydraulic relief valve, opening of which vents fluid from the loaded hydraulic jack *means* to enable lowering of *the* same by gravity, and closure of which halts such lowering, and the control means operating said valve comprises a switch *for controlling energization of the valve solenoid* and a switch-actuating member *for said switch,* carried by the elevator means for movement thereon between opposite switch-actuating positions and engageable by the top [panel] *sheet* on the platform stack, said *switch-actuating* member being movable into one switch-actuating position to open the valve by engagement of such member by a [panel] *sheet* transferred to the stack, to initiate lowering of the [hydraulic] jack *means,* and said member being movable oppositely to close said valve again after the jack *means,* and thereby said *sheet* [panel] engaged by said switch-actuating member, has descended [by] substantially [a panel's] *the* thickness *of a sheet* relative to the elevator means.

9. *Sheet* [Panel] stacking apparatus comprising a [panel] *sheet*-supporting rack including a plurality of supporting shelves arranged in vertical series therein, said rack having an open discharge end for edgewise removal of the [panels] *sheets* from the rack shelves, a stacking platform disposed adjacent to said rack's discharge end, [conveyor] *transfer* means cooperating with said rack, means operable to vary progressively the elevation of said [conveyor] *transfer* means in relation to the rack to transfer the [panels] *sheets* generally edgewise from the *spaces above* the different rack shelves, in successive order to depositing locations directly above said platform and for depositing thereon, and jack means operable to adjust automatically the elevation of said platform, and hence of the top of the stack thereon, relative to the elevation of the [conveyor] *transfer* means, to locate the top of the stack in [panel] *sheet*-receiving position at all times slightly below [said conveyor means elevation] *the elevation of said transfer means.*

10. *The sheet* [S]stacking apparatus defined in claim 9, wherein the rack comprises an open-ended framework, and the plurality of rack shelves are supported, vertically arranged, by said framework, said shelves individually comprising a longitudinal member spaced from and between the sides of said framework, transverse support members extending between the framework sides, a first one at a location generally between the ends of the rack, and another at a location spaced longitudinally therefrom, to support said longitudinal member projecting *in* cantilever fashion from said first transverse member in the direction away from the other transverse member, the projecting cantilever portions of the longitudinal members of the plurality of shelves in the rack defining both longitudinal and vertical unobstructed openings therebetween, and further wherein the [conveyor] *transfer* means comprises a plurality of [belt conveyors] *conveyor belts* movable in the rack spaces adjacent to and between said longitudinal members.

11. [Panel] *Sheet* stacking apparatus comprising rack means for initially supporting a series of substantially horizontally disposed [panels] *sheets* arranged in spaced superposed relationship, platform supporting means movable vertically incrementally distances corresponding to the vertical spacing between the [panels] *sheets* of said series, a *sheet* stack[ing] *supporting* platform disposed adjacent to said rack means, carried by said platform supporting means and operable to receive thereon a stack of [panels] *sheets* discharged from said rack means, means operable to alter the vertical position of said [stacking] platform relative to said platform supporting means to dispose the top of the [panel] *sheet* stack on said platform slightly below a [panel] *sheet* supported by said rack means in each incrementally adjusted position of said platform supporting means irrespective of the height of the [panel] *sheet* stack on said platform, and means operable to transfer said [panels] *sheets* individually edgewise from said rack means into stacked position on said platform.

*12. Sheet handling mechanism comprising first elevator means, second elevator means movable relative to said first elevator means, sheet stack supporting means carried by said second elevator means, sheet transfer means carried by said first elevator means at one side of and higher than said sheet stack supporting means, means operable to move said first elevator means to dispose said sheet transfer means in various vertical positions, and means operable to effect movement of said second elevator means relative to said first elevator means to shift the top of a stack of sheets on said sheet stack supporting means relative to said sheet transfer means.*

*13. Sheet handling mechanism comprising first elevator means, second elevator means carried by said first elevator means and movable relative thereto, sheet stack supporting means carried by said second elevator means, sheet transfer means carried by said first elevator means at one side of and higher than said sheet stack supporting means, means operable to move said first elevator means to dispose said sheet transfer means in various vertical positions, and means operable to effect movement of said second elevator means relative to said first elevator means to shift the top of a stack of sheets on said sheet stack supporting means relative to said sheet transfer means.*

*14. Sheet handling mechanism comprising first elevator means, second elevator means movable relative to said first elevator means, sheet stack supporting means carried by said second elevator means, sheet transfer means carried by said first elevator means at one side of and higher than said sheet stack supporting means, means operable to effect movement of said second elevator means relative to said first elevator means to shift the top of a stack of sheets on said sheet stack supporting means relative to said sheet transfer means, sheet conveying means including a plurality of sheet conveying shelves disposed in closely spaced superposed relationship alongside said first elevator means and said sheet transfer means, and means operable to move said first elevator means to dispose said sheet transfer means successively in registry with said respective sheet conveying shelves of said sheet conveying means.*

*15. Sheet handling mechanism comprising first elevator means, second elevator means movable relative to said first elevator means, sheet stack supporting means carried by said second elevator means, sheet transfer means carried by said first elevator means at one side of and higher than said sheet stack supporting means, means operable to move said first elevator means to dispose said sheet transfer means in various vertical positions, and means operable to effect movement of said second elevator means relative to said first elevator means to locate the top of a stack of sheets on said sheet stack supporting means substantially at the level of said sheet transfer means in its various vertical positions.*

*16. Sheet handling mechanism comprising first elevator means, second elevator means movable relative to said first elevator means, sheet stack supporting means carried by said second elevator means, sheet transfer means carried by said first elevator means at one side of and higher than said sheet stack supporting means and including upper and lower rotatable powered pinching members, means operable to move said first elevator means to dispose said sheet transfer means in its various vertical positions, and means operable to effect movement of said second elevator means relative to said first elevator means to locate the top of a stack of sheets on said sheet stack supporting means substantially at the level of said upper*

*and lower pinching members in their various vertical positions.*

*17. Sheet handling mechanism comprising first elevator means, second elevator means movable relative to said first elevator means, sheet stack supporting means carried by said second elevator means, sheet transfer means carried by said first elevator means at one side of and higher than said sheet stack supporting means and including upper and lower rotatable powered pinching members, said upper pinching member being a powered roll, means supporting said powered roll for elevational movement toward and away from said lower member, means operable to move said first elevator means to dispose said sheet transfer means in its various vertical positions, and means operable to effect movement of said second elevator means relative to said first elevator means to locate the top of a stack of sheets on said sheet stack supporting means substantially at the level of said upper and lower pinching members in their various vertical positions.*

*18. Sheet handling mechanism comprising sheet conveying means including a plurality of sheet conveying shelves disposed in closely spaced superposed relationship, sheet transfer means disposed alongside said sheet conveying means, first elevator means carrying said sheet transfer means and operable step-by-step to move said sheet transfer means between successive positions in registry with said respective sheet conveying shelves of said sheet conveying means, second elevator means carried by said first elevator means, and sheet stack supporting means carried by said second elevator means and movable thereby relative to said sheet transfer means as successive sheets are moved by said transfer means relative to a stack of sheets carried by said sheet stack supporting means, to maintain the top of a stack of sheets on said sheet stack supporting means at substantially the level of said sheet transfer means.*

*19. Sheet handling mechanism comprising sheet conveying means including a plurality of sheet conveying shelves disposed in closely spaced superposed relationship, pinching type sheet transfer means disposed alongside said sheet conveying means and including a movable lower member, an upper presser roll member, power means operable to drive at least one of said members and means operable to move said presser roll member up and down relative to said lower member to clamp a sheet therebetween, first elevator means carrying said sheet transfer means and operable step-by-step to move said sheet transfer means between successive positions in registry with said respective sheet conveying shelves of said sheet conveying means, second elevator means movable relative to said first elevator means, sheet stack supporting means carried by said second elevator means, and means operable to effect movement of said second elevator means relative to said first elevator means as successive sheets are moved by said sheet transfer means relative to a stack of sheets carried by said sheet stack supporting means to maintain the top of a stack of sheets on said sheet stack supporting means at a predetermined level relative to said sheet transfer means.*

*20. Sheet handling mechanism comprising sheet conveying means including a plurality of sheet conveying shelves disposed in closely spaced superposed relationship, sheet transfer means disposed alongside said sheet conveying means including movable upper and lower pinching members at least one of which is powered, the upper pinching member being a roll, first elevator means carrying said sheet transfer means and movable intermittently step-by-step in predetermined increments to move said sheet transfer means between successive positions in registry with said respective sheet conveying shelves of said sheet conveying means, means supporting said upper roll for movement relative to said lower movable member when said sheet transfer means are in registry with one of said sheet conveying shelves to effect movement of a sheet relative to such shelf, second elevator means carried by said first elevator means, and sheet stack supporting means carried by said second elevator means and movable thereby relative to said sheet transfer means as successive sheets are moved by said sheet transfer means relative to a stack of sheets carried by said sheet stack supporting means, to maintain the top of a stack of sheets on said sheet stack supporting means substantially at the level of said sheet transfer means.*

References Cited in the file of this patent or the original patent

UNITED STATES PATENTS

| | | |
|---|---|---|
| 1,615,813 | Romine | Jan. 25, 1927 |
| 1,772,734 | Romine | Aug. 12, 1930 |
| 2,113,926 | Pierce | Apr. 12, 1938 |
| 2,181,357 | Chipman | Nov. 28, 1938 |
| 2,228,887 | Peterson | Jan. 14, 1941 |
| 2,376,176 | Neja | May 15, 1945 |